United States Patent [19]

Strusch et al.

[11] Patent Number: 4,972,714
[45] Date of Patent: Nov. 27, 1990

[54] MECHANICAL SPEED GOVERNOR FOR AN INTERNAL COMBUSTION ENGINE

[75] Inventors: Wolfgang Strusch, Cologne; Werner Lemme, Rosrath; Horst-Herbert Krause, Ohringen, all of Fed. Rep. of Germany

[73] Assignee: Kloeckner-Humboldt-Deutz AG, Cologne, Fed. Rep. of Germany

[21] Appl. No.: 398,190

[22] Filed: Aug. 24, 1989

[51] Int. Cl.$^5$ ............................................. G05D 13/14
[52] U.S. Cl. ..................................................... 73/550
[58] Field of Search .................. 73/535, 550; 123/364

[56] References Cited

U.S. PATENT DOCUMENTS 3,699,288 10/1972 Sworeland et al. ............. 73/535
4,346,598 8/1982 Hebb ............................... 73/550

Primary Examiner—John Chapman
Attorney, Agent, or Firm—Charles L. Schwab

[57] ABSTRACT

A mechanical governor for an internal combustion engine with a measuring element optimized with respect to weight and working capacity. The governor sleeve is of a thin-walled, light weight construction and centrifugal weights are provided which have stops to prevent collision and entanglement with the governor sleeve. The bearing pins for the centrifugal weights are located near the radially outer circumference of the governor configuration.

15 Claims, 4 Drawing Sheets (A)

(D)

(E)

(B)

(F)

(G)

(C)

(H)

MECHANICAL SPEED GOVERNOR FOR AN INTERNAL COMBUSTION ENGINE

TECHNICAL FIELD

This invention relates to a mechanical governor of the type having centrifugal weights pivotally supported on a carrier and operable to shift a governor sleeve which is slidably mounted on a shaft journal.

PRIOR ART STATEMENT

In a mechanical governor, a measuring mechanism transforms the rotary speed signal into a linear signal, which is transmitted to the injection pump in order to regulate the quantity of fuel injected. In this regard it is important that the moving masses of the governor, specifically those of the measuring mechanism (governor sleeve and centrifugal weights), exhibit a low weight in order to achieve good control behavior even in inclined positions of the motor.

Furthermore, the structural space available inside the governor housing should be optimally utilized for the working capacity or for the quality of control, that is, centrifugal weight mass should be weight-optimized with its center of gravity lying as far as possible outwardly from the rotation axis of the shaft journal of the governor.

Weight-optimized governor sleeves often exhibit the disadvantage either that the centrifugal weights are arranged very close to the rotation axis and thus represent a relatively small working capacity, or that special support means are required on the sleeve for the centrifugal weights to prevent the centrifugal weight in the innermost position from becoming entangled with the sleeve. This results in use of additional space and added weight.

An increase in the working capacity by enlarging the centrifugal weights requires an undesirable enlargement of space, and the centrifugal weights in the operating state exhibit a larger inertia, corresponding to their mass, whereby the governor rod oscillates relative to the motor and the quality of control is impaired.

OBJECTS AND BRIEF SUMMARY OF THE INVENTION

It is the object of the invention to create, by means of simple design measures, a space-saving mechanical engine governor whose measuring element is designed in a functionally reliable fashion and optimized with respect to weight and working capacity.

The governor sleeve is a thin-walled structural part, which is shifted axially by centrifugal weights. The weights and sleeve have stops and are so designed as to extract the optimal working capacity from the structural space available. The stops are so designed that they prevent the centrifugal weights and governor sleeve from becoming entangled and, with the smallest possible mass, provide a center of gravity for the centrifugal weights that lies as far radially outward as possible.

At the ends of its sliding seat, the governor sleeve has circumferential grooves which prevent the penetration of foreign bodies and thus prevent jamming of the governor sleeve.

For the sake of simplicity, the governor sleeve can be formed with thin-walled construction from a one-piece sheet-metal part. Also, the governor sleeve can be made from two or more assembled components, which are secured to each other by means of brazing, welding or forming.

In accordance with the various loadings on the governor sleeve, the components used for the governor sleeve can be selected from various materials. For example, a sintered part may be used on the less severely loaded side, and a part of hardenable steel may be installed on the more severely loaded side.

When centrifugal weights with curved ends are used, an embodiment of the invention includes a governor sleeve provided with a stop made of plastic, which serves as a bearing surface for the centrifugal weights in the at-rest position. This provides a well-defined position of the centrifugal weights at rest and prevents the centrifugal weights from becoming entangled with the sleeve.

For better mountability on the centrifugal weight carrier, the centrifugal weight may be a component with an additional elastic element, which in the installed condition engages the bearing pin on its non-loaded side. A bushing may be attached to the centrifugal weight to accept the bearing pin.

In a further embodiment of the invention, the centrifugal weight consists of two sheet-metal and/or plastic parts, which are rigidly connected to each other and are so shaped that a bearing opening is produced therebetween to accept the bearing pin.

Also, the centrifugal weight may be made from an easily deformable sheet-metal part, into which bearing surfaces are formed in confronting relation to one another to accept the bearing pin. In the embodiments just cited, the bearing can be with or without a liner, depending on loading.

BRIEF DESCRIPTION OF THE DRAWING

Preferred embodiments of the invention are illustrated in the drawings, in which.

DETAILED DESCRIPTION OF THE INVENTION

Figure 1:
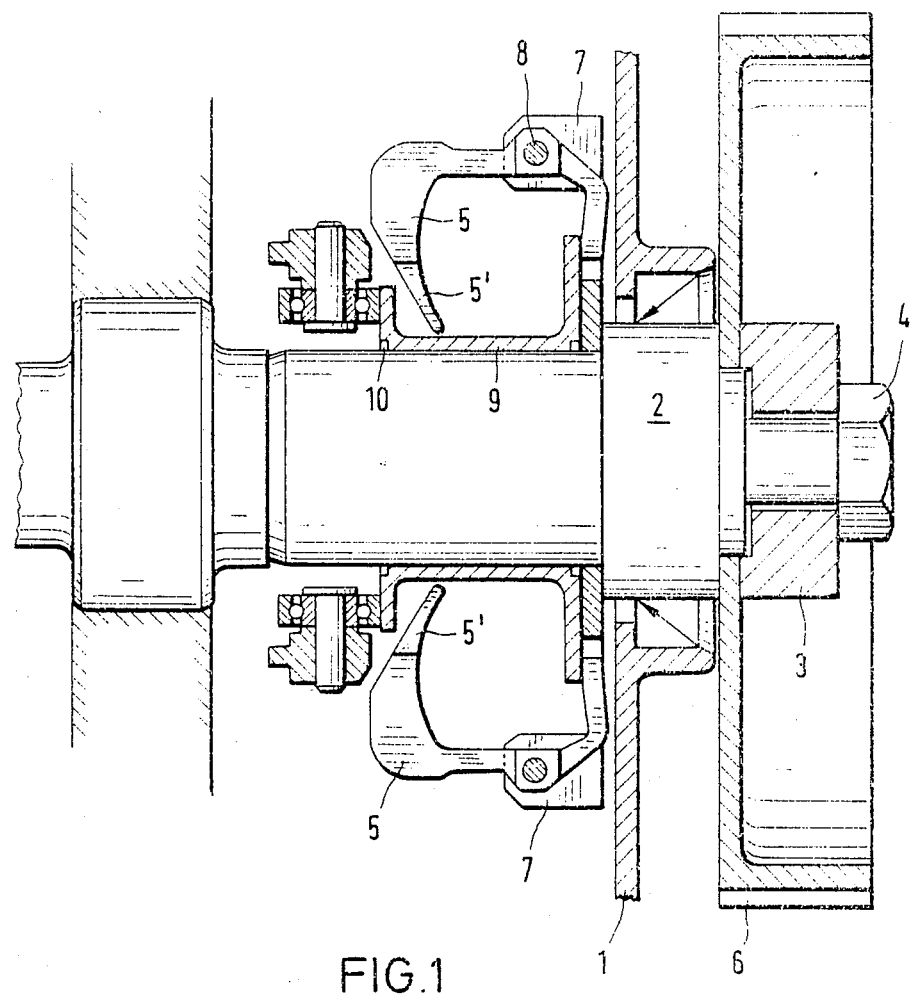
FIG. 1 is a section through a mechanical speed governor with the components of a first preferred embodiment of the invention.

The first preferred embodiment (FIG. 1) shows a cross section of the housing 1 of a mechanical speed governor together with an extension 2 of a camshaft of an injection pump (not illustrated). A hex headed cap screw 4 aligned with the camshaft axis secures the extension 2 to the camshaft. A drive pulley 6 of the injection pump is secured to the extension 2 by a washer 3.

An axially shiftable governor sleeve 9 is slidably mounted on the extension 2. A centrifugal weight carrier 7 is mounted on and rotates with the shaft extension 2. The carrier 7 presents circumferentially spaced brackets mounting bearing pins 8, each of which serves to pivotally support an angle-shaped centrifugal weight 5. The governor sleeve 9, which is also shown in FIG.

2A, consists of a thin-walled structural part, which is shifted axially on the extension 2 by the motion of the centrifugal weights. Radially inward extending abutments of the centrifugal weights 5 abut axially against an abutment in the form of the axial sliding movement of the sleeve 9. The sleeve 9 together with a system of levers, (not shown), moves a governor rod of an injection pump.

An abutment 5' is integrally formed on the centrifugal weight 5 and serves to prevent the centrifugal weight from colliding with or becoming entangled with the governor sleeve.

It is thus possible to position the centrifugal weight bearing pins 8 at a relatively extreme radially outward position to provide optimal working capacity in a relatively small structural space. The opposite axial ends of the sliding seat at the interior diameter of the governor sleeve 9 are provided with grooves 10, which prevent the penetration of foreign bodies which would otherwise cause jamming of the governor sleeve on the extension 2.

The spool shaped governor sleeve can also be fabricated from several parts. In the embodiment shown in FIG. 2B, the more severely loaded shoulder part 13 is made from steel, while part 12 is made from caste metal or from sheet metal. In the embodiment shown in FIG. 2C, the governor sleeve consists of a thin-walled pipe 14, parallel to the axis, with disks 13, 16 welded or bonded to its opposite ends. This makes it possible to select a hard material for the shoulder part 13 and to use a material with good antifriction properties for the cylindrical body or pipe 14. Furthermore, sleeves of various lengths can easily be made by varying the cylindrical body length.

FIGS. 2D through 2H show embodiments of the invention in which the governor sleeve is encompassed by a plastic part which acts as a stop and also shows a centrifugal weight which has a curved end in abuttable relation to the ring shaped plastic part.

Figure 2:
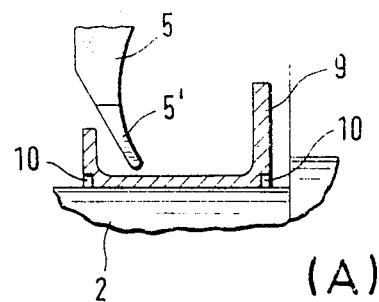
FIGS. 2A through 2H are sections through various embodiments of the centrifugal weight with stop, as well as various embodiments of the governor sleeve, some of which include a plastic stop for the governor weights.
Figure 2:
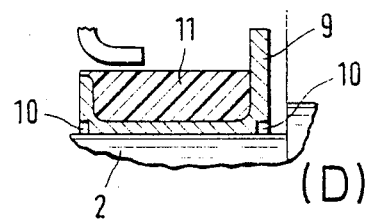
Figure 2:
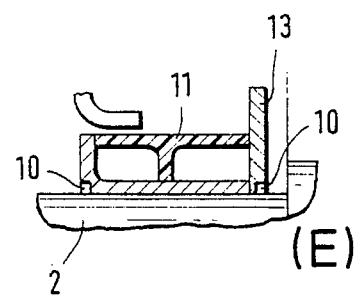
Figure 2:
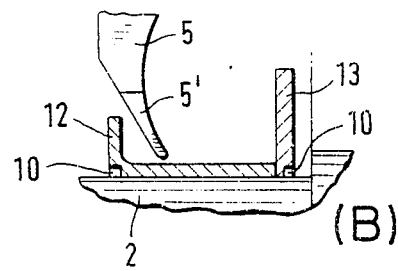
Figure 2:
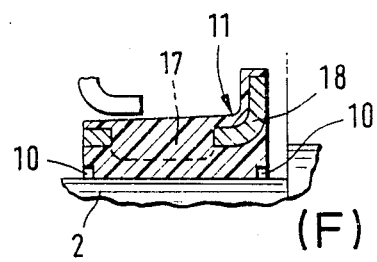
Figure 2:
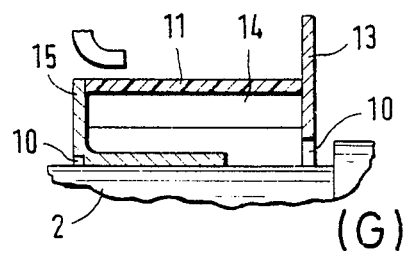
Figure 2:
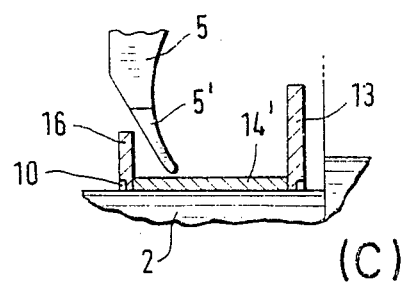
Figure 2:
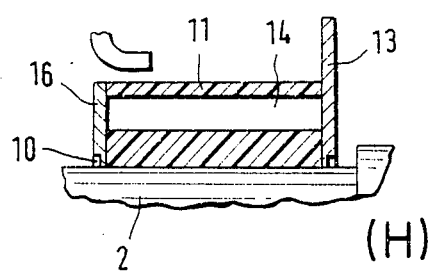

The governor sleeve shown in FIG. 2D is filled with a ring-like plastic part 11. FIG. 2E shows a metal governor sleeve similar to that of FIG. 2B, which is filled or extrusion-coated with a plastic part II. The end faces of the governor sleeve are also provided with grooves 10. The plastic filler part 11 can be placed on the sleeve as a finished part and serves, as does the extrusion coating, as a support for the curved end part of the centrifugal weight, variations of which are shown in FIG. 3.

The governor sleeve in the embodiment shown in FIG. 2F consists of a steel part 18 extrusion-coated with plastic material. The steel part 18, for weight reduction reasons, is provided with peripheral holes 17 which are filled with plastic material. The plastic material slides directly on the shaft extension 2 and is provided with grooves 10 at opposite ends of its sliding seat.

In the embodiments shown in FIGS. G and H, the two opposite shoulder parts 13, 15 and 13, 16 are connected to each other at the desired governor sleeve length by the part 14, and the space between the shoulder parts and radially outward of said part 14 is filled by a plastic material 11 to form a radially outward facing abutment surface for the centrifugal weights. Depending on the design of the shoulders 15 or 16, the governor sleeve can slide on the plastic material 11, as shown in FIG. 2H, or can slide on the metallic part 15 as shown in FIG. 2G. The governor sleeves can be made of various materials, corresponding to the various loadings, so that the more severely loaded shoulder part 13 can be made, for example, from hardenable steel.

Figure 3:
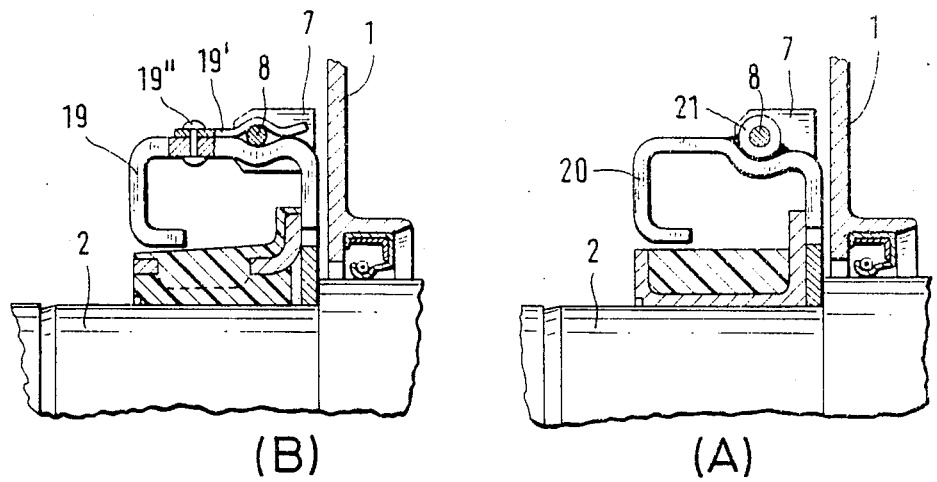
FIGS. 3A through 3F illustrate various embodiments of the centrifugal weight with curved ends.
Figure 3:
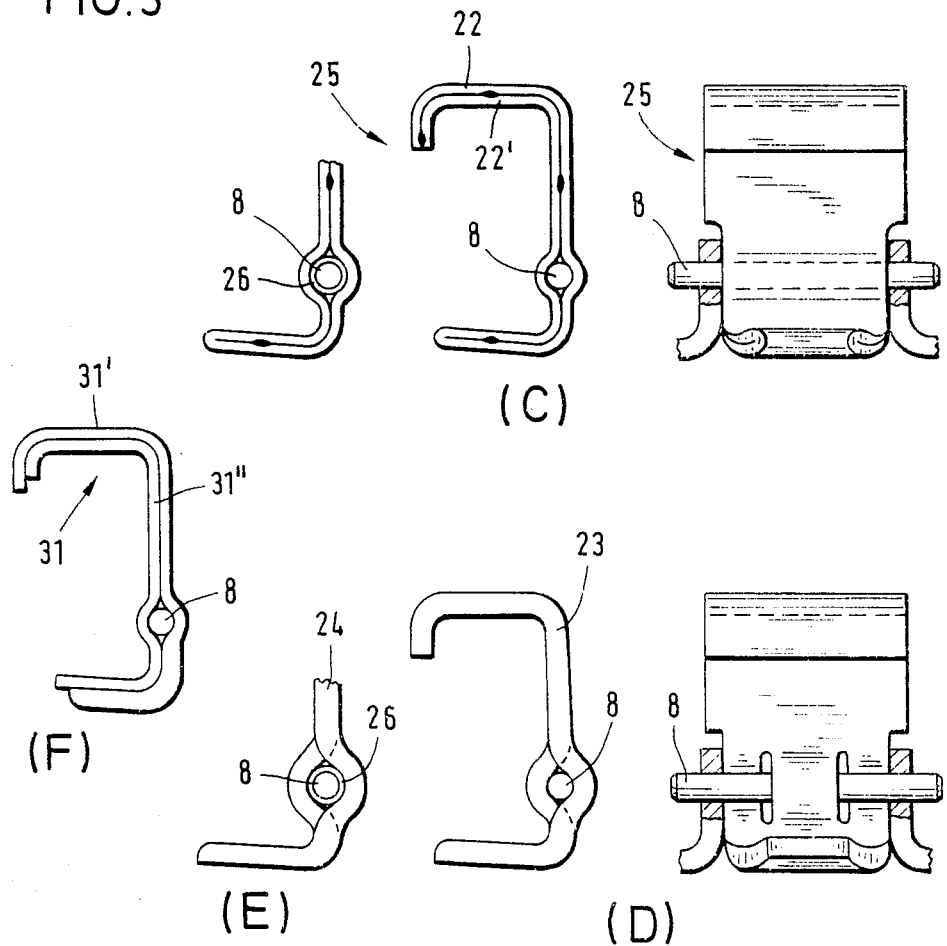

FIG. 3 shows centrifugal weight variations, each with a curved end part. In the embodiment of FIG. 3a, a centrifugal weight is made in one piece from a sheet-metal part 20, to which a bushing 21 is welded to accept the bearing pin 8.

In the embodiment of FIG. 3b, an elastic element 19, is attached to a centrifugal weight 19. The elastic element 19, in its installed condition engages the bearing pin 8 on its non-loaded side and keeps the bearing surface of the weight in bearing engagement with the bearing pin 8. In this embodiment the side of the centrifugal weight acting as a bushing shell is stamped or, in the case of a cast centrifugal weight, directly cast into the part. The elastic element 19, is riveted to the centrifugal weight by a rivet 19", but it can also be attached thereto with a screw or the like.

In the embodiment of FIGS. 3c and 3f, the centrifugal weight 25 or 31 is made from sheet metal or plastic in sandwich construction. A cylindrical bearing is provided between the two parts to accept the bearing pin 8, on which the centrifugal weight is mounted. Depending on the loading requirements, a bearing bush 26 can be inserted therein. The centrifugal weight can be made from a sheet, which is brought into its doubled condition by working, or assembled from two halves 22 and 22' or 31' and 31", which are attached to each other by spot-welding, riveting or forging, or connected, for example, as a plastic part, by clips. In the embodiment of FIG. 3f, the constituents of the centrifugal weight 31' and 31" are connected to each other by axially sliding them together and then attaching them together by spot welding, riveting or the like.

In the embodiment of FIG. 3d, a centrifugal weight 23, is made from an easily deformable material and has a bearing which is formed in alternate directions in the sheet metal. It can also be equipped with a bearing bushing 26 depending on application.

In the embodiment of FIG. 3e the centrifugal weight 24 consists of a forged part wherein there is provided a bearing, with or without a bushing 26, to accept the bearing pin 8.

The above described components of the speed measuring element, governor sleeve and centrifugal weights are all designed for an optimized with respect to weight and working capacity.

Figure 4:
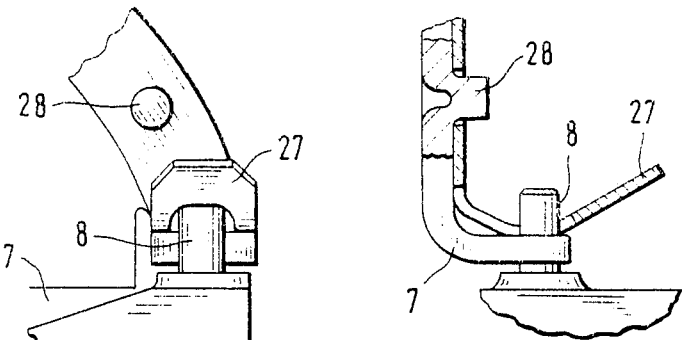
FIGS. 4A through 4E show examples of the installation of centrifugal weights in centrifugal weight carriers.
Figure 4:
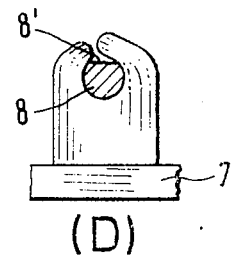
Figure 4:
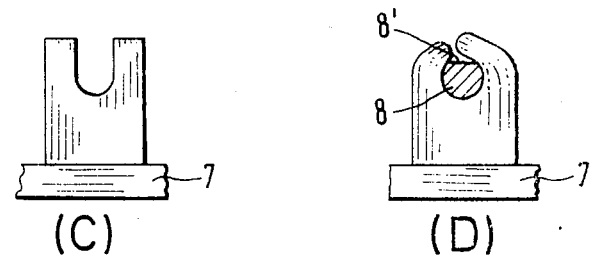
Figure 4:
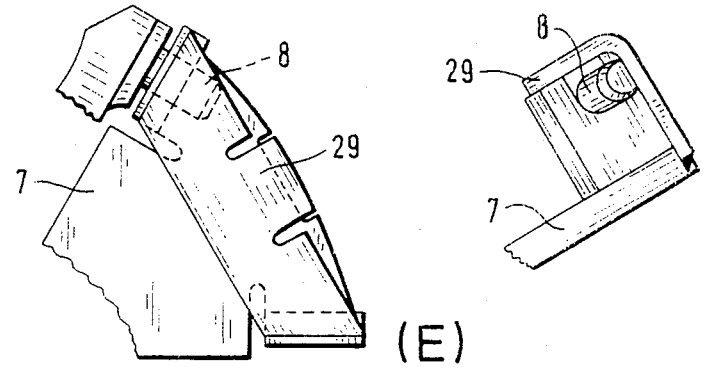
Figure 4:
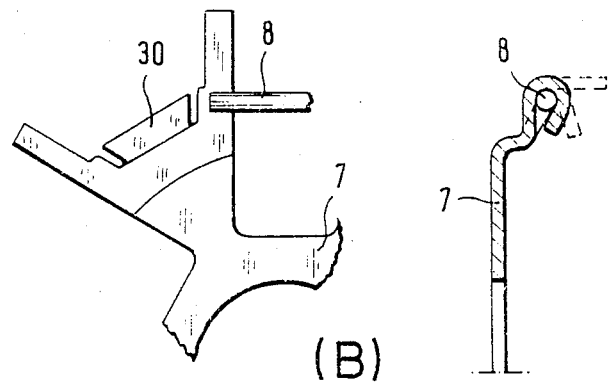

FIG. 4 shows centrifugal weights supported in the centrifugal weight carriers of differing designs.

FIG. 4a shows bearing pins inserted into the brackets of the centrifugal weight carrier and held fixed in position by a spring element 27. The spring element is put on a pin 28 on the centrifugal weight carrier and accepts adjacent ends of two bearing pins.

An attachment part, in the embodiment of FIG. 4b, provides a raised gib 30, which lies between two adjacent centrifugal weights in abutting relation to the respective bearing pin ends to thereby maintain the bearing pins laterally in their desired position.

In order to make mounting easier, the slots in the brackets of the centrifugal weight carrier can be made open at one end as shown in the embodiment of FIG. 4a, 4d and 4e.

FIG. 4d shows an embodiment in which the ends of the brackets are depressed by deformation onto the ends of the bearing pins 8 and hold the latter fixed in their position. The ends 8' of the bearing pins are flattened in order to increase the locking engagement between the depressed bracket ends and the bearing pin ends.

In the embodiment of FIG. 4e, a part 29 is placed as cover on the bearing pin ends and is welded to the centrifugal weight carrier 7 in order to fix the bearing pin ends in their proper position.

The embodiments of the invention in which an exclusive property or privilege is claimed are defined as follows:

1. In a mechanical governor for an internal combustion engine, having at least two angle-shaped centrifugal weights, pivotably supported on a centrifugal weight carrier in circumferentially spaced brackets, an axially shiftable governor sleeve slidable on a shaft journal, said governor sleeve being thin-walled structural part, having an operative connection with said centrifugal weights, engageable abutments on said centrifugal weights and governor sleeve, a sliding inner diameter cylindrical surface on said governor sleeve in sliding engagement with said shaft journal and circumferential grooves in said sleeve at the opposite ends of said cylindrical surface.

2. The mechanical governor of claim 1, wherein said governor sleeve is a metallic part.

3. The mechanical governor of claim 1, wherein said governor sleeve is composed of various materials.

4. The mechanical governor of claim 1 wherein said governor sleeve includes a metallic part and a plastic part (11), said plastic part serving as an abutment and wherein said centrifugal weights have curved ends (19, 20, 23, 24, 25) which abut the plastic part (11) when said engine is not operating.

5. The mechanical governor of claim 1 and further comprising a bearing pin pivotally supporting each of said centrifugal weights and wherein each of said centrifugal weights includes a component (19) having an elastic element (19,) engaging said bearing pin (8) to maintain said weight in bearing engagement with said bearing pin.

6. The mechanical governor of claim 1 wherein said centrifugal weight (23) includes spaces bearing portions deformed in opposite directions and further comprising a bearing pin (8) mounted on said carrier and in bearing engagement with said bearing portions.

7. The mechanical governor of claim 1 and further comprising a bearing part (21) attached to said centrifugal weight (20) and a bearing pin (8) mounted on carrier and in bearing engagement with said bearing part.

8. The mechanical governor of claim 1 and further comprising a bearing pin mounted on said carrier and wherein said weight comprises two sheet-metal parts (22, 22,), which are rigidly connected to each other and are so shaped as to produce between them a bearing in bearing engagement with said bearing pin (8).

9. The mechanical governor of claim 1 and further comprising a bearing pin mounted on said carrier and wherein said centrifugal weight comprises two parts (31', 31'') connected to each other by relative sliding movement in the direction of the axis of said bearing pin and including bearing surface indentations engaging said bearing pin positioned therebetween.

10. The mechanical governor of claim 1 and further comprising a bearing bushing mounted on said centrifugal weight.

11. The mechanical governor of claim 1 wherein said brackets on said centrifugal weight carrier (7) present slots adapted to support a bearing pin, said slots being open at one end.

12. The mechanical governor of claim 11 and further comprising a bearing pin (8) pivotally supporting said centrifugal weight, said bearing pin being connected to said centrifugal weight carrier by means of a clip (27, 29) attached to the centrifugal weight carrier (7).

13. The mechanical governor of claim 1 and further comprising bearing pins attached to said brackets of said centrifugal weight carrier, said bearing pins having flattened portions on their ends, and said brackets being deformed adjacent said flattened portions to attach said pins to said brackets.

14. The mechanical governor of claim 1 and further comprising a bearing pin for each weight mounted on a pair of said brackets and raised gibs (30) between each two adjacent centrifugal weights operable to limit endwise shifting of said pins.

15. A mechanical governor for an internal combustion engine comprising:
a rotatable shaft extension presenting a journal,
a centrifugal weight carrier mounted on, and rotating with said shaft extension, said weight carrier presenting circumferentially spaced brackets.
a plurality of angularly shaped centrifugal weights,
bearing pins pivotally supporting said centrifugal weights on said brackets,
a governor sleeve mounted on said shaft extension and having
a cylindrical pipe part presenting an inner diameter surface in sliding engagement with said shaft journal permitting axial movement of said sleeve relative to said journal,
flanges secured to and extending radially outward from axially opposite ends of said cylindrical part and
a ring of plastic disposed between said flanges and surrounding said pipe part,
axially engageable abutments on said centrifugal weight and the axially outer side of one of said flanges whereby said sleeve is shifted axially upon outward swinging movement of said centrifugal weight, and
a stop on said centrifugal weight radially engaging the radially outer periphery of said plastic ring when said shaft extension is not rotating.

* * * * *

UNITED STATES PATENT AND TRADEMARK OFFICE
CERTIFICATE OF CORRECTION

PATENT NO. : 4,972,714

DATED : Nov. 27, 1990

INVENTOR(S) : Wolfgang Strusch, Werner Lemme, Horst-Herbert Krause

It is certified that error appears in the above-identified patent and that said Letters Patent is hereby corrected as shown below:

On the cover page of the patent insert:

"[30]     Foreign Application Priority Data

Aug. 25, 1988 [DE] Fed. Rep. of Germany ...... 3828772"

Column 5, Line 37, cancel "(19,)" and substitute "(19')"

Column 5, Line 41, cancel "spaces" and substitute "spaced"

Column 5, Line 53, cancel "(22, 22,)" and substitute "(22, 22')"

Signed and Sealed this

Thirty-first Day of March, 1992

Attest:

HARRY F. MANBECK, JR.

*Attesting Officer*     *Commissioner of Patents and Trademarks*